(12) United States Patent
Li et al.

(10) Patent No.: US 11,930,403 B2
(45) Date of Patent: Mar. 12, 2024

(54) BANDWIDTH MODE INDICATION METHOD AND APPARATUS, AND CHANNEL INDICATION METHOD AND APPARATUS

(71) Applicant: Huawei Technologies Co., Ltd., Shenzhen (CN)

(72) Inventors: Yunbo Li, Shenzhen (CN); Jian Yu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 609 days.

(21) Appl. No.: 17/126,414

(22) Filed: Dec. 18, 2020

(65) Prior Publication Data

US 2021/0105667 A1 Apr. 8, 2021

Related U.S. Application Data

(63) Continuation of application No. PCT/CN2019/091953, filed on Jun. 19, 2019.

(30) Foreign Application Priority Data

Jun. 20, 2018 (CN) .......................... 201810636395.2

(51) Int. Cl.
*H04W 48/10* (2009.01)
*H04L 5/00* (2006.01)
(Continued)

(52) U.S. Cl.
CPC ........... *H04W 28/20* (2013.01); *H04L 5/0053* (2013.01); *H04L 5/0092* (2013.01); *H04L 25/03866* (2013.01); *H04W 72/0453* (2013.01)

(58) Field of Classification Search
None
See application file for complete search history.

(56) References Cited

U.S. PATENT DOCUMENTS 9,820,304 B2 * 11/2017 Gong ................. H04W 74/0816
10,085,258 B2 * 9/2018 Yu ....................... H04W 72/0453
(Continued)

FOREIGN PATENT DOCUMENTS

CN 102281595 A 12/2011
CN 104247316 A 12/2014
(Continued)

OTHER PUBLICATIONS

Bellalta, B., "IEEE 802.11ax: High-efficiency WLANS", IEEE Wireless Communications, vol. 23, Issue: 1, Feb. 2016, 9 pages.
(Continued)

*Primary Examiner* — Sithu Ko
(74) *Attorney, Agent, or Firm* — Slater Matsil, LLP

(57) ABSTRACT

When a first device is an EHT site, a second device generates a frame in a first non-HT format or a frame in a first non-HT duplicated format, where at least three bits in the first seven bits of a scrambling sequence of the frame in the first non-HT format or the frame in the first non-HT duplicated format indicate a bandwidth mode of a channel; or when a first device is a VHT site or an HE site that does not support an EHT, a second device generates a frame in a second non-HT format or a frame in a second non-HT duplicated format, where two bits in the first seven bits of a scrambling sequence of the frame in the second non-HT format or the frame in the second non-HT duplicated format indicate a bandwidth mode of a channel.

20 Claims, 8 Drawing Sheets

(51) Int. Cl.
*H04L 25/03* (2006.01)
*H04W 28/20* (2009.01)
*H04W 72/0453* (2023.01)

(56) References Cited

U.S. PATENT DOCUMENTS

| | | | |
|---|---|---|---|
| 10,542,526 B2* | 1/2020 | Seok | H04W 74/0808 |
| 10,560,240 B2* | 2/2020 | Kim | H04B 7/0452 |
| 10,848,233 B2* | 11/2020 | Vermani | H04L 5/0044 |
| 11,115,104 B2* | 9/2021 | Huang | H04B 7/0697 |
| 11,330,465 B2* | 5/2022 | Xin | H04L 69/22 |
| 2013/0315219 A1 | 11/2013 | Cheong et al. | |
| 2014/0334476 A1 | 11/2014 | Cheong et al. | |
| 2015/0312386 A1* | 10/2015 | Lee | H04L 69/04 370/338 |
| 2016/0143018 A1 | 5/2016 | You et al. | |
| 2017/0064708 A1 | 3/2017 | Noh et al. | |
| 2019/0021091 A1* | 1/2019 | Ko | H04W 72/0453 |
| 2019/0116545 A1* | 4/2019 | Verma | H04W 8/24 |
| 2020/0162963 A1* | 5/2020 | Alpert | H04L 1/0025 |

FOREIGN PATENT DOCUMENTS

| | | | |
|---|---|---|---|
| CN | 104412694 A | | 3/2015 |
| CN | 106954273 A | | 7/2017 |
| KR | 20120128561 A | | 11/2012 |
| KR | 20160084301 A | * | 7/2016 |
| KR | 20160084301 A | | 7/2016 |

OTHER PUBLICATIONS

IEEE Std 802.11™—2016, IEEE Standard for Information technology—Telecommunications and information exchange between systems, Local and metropolitan area networks—Specific requirements; Part 11: Wireless LAN Medium Access Control (MAC) and Physical Layer (PHY) Specifications, Approved Dec. 7, 2016, 3534 pages.

IEEE P802.11ax™/D2.0, Oct. 2017, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, 596 pages.

IEEE Std 802.11ac™—2013, IEEE Standard for Information technology—Telecommunications and information exchange between systems, Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz, 425 pages.

* cited by examiner

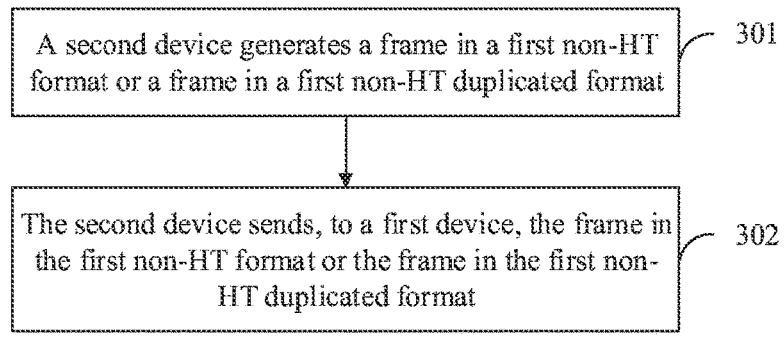
FIG. 3-1
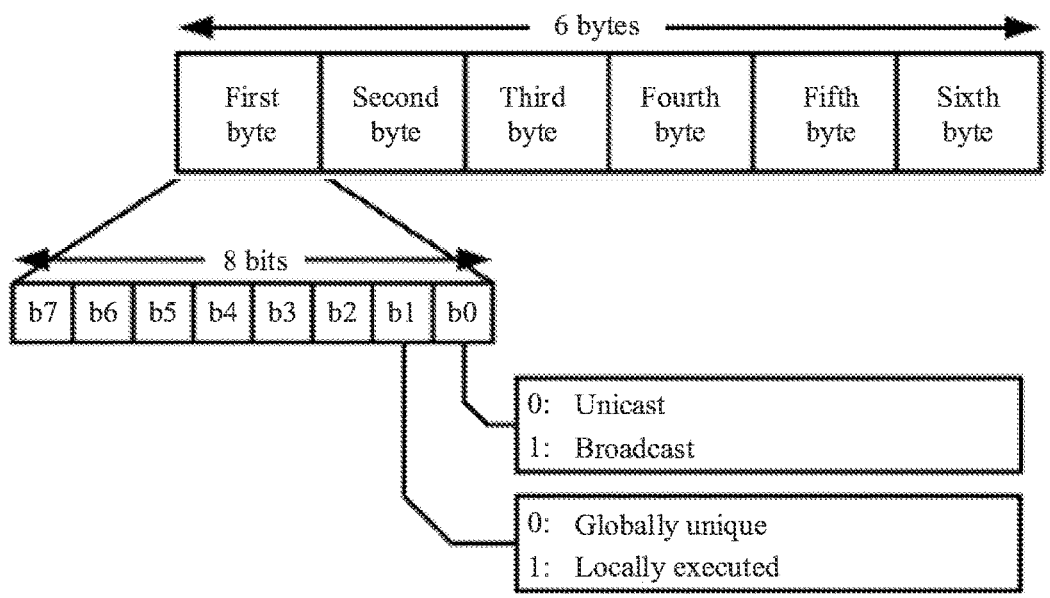
FIG. 3-2
| Protocol version | Type | Subtype | ToDS | FromDS | More fragments | Retry | Power management | More data | Protected frame | +HTC/ Order |
FIG. 3-3

US 11,930,403 B2

BANDWIDTH MODE INDICATION METHOD AND APPARATUS, AND CHANNEL INDICATION METHOD AND APPARATUS

CROSS-REFERENCE TO RELATED APPLICATIONS

This application is a continuation of International Application No. PCT/CN2019/091953, filed on Jun. 19, 2019, which claims priority to Chinese Patent Application No. 201810636395.2, filed on Jun. 20, 2018. The disclosures of the aforementioned applications are hereby incorporated by reference in their entireties.

TECHNICAL FIELD

This application relates to the communications field, and in particular, to a bandwidth mode indication method and apparatus, and a channel indication method and apparatus.

BACKGROUND

In a wireless local area network, a transmit end and a receive end are in different radio channel environments. Before the transmit end and the receive end perform data communication, if the transmit end and the receive end can obtain an available bandwidth through negotiation based on channel availability of the transmit end and the receive end, it is very useful for the data communication between the transmit end and the receive end.

To obtain the available bandwidth through negotiation, currently, the transmit end may send a bandwidth mode of a channel to the receive end before performing the data communication. Currently, bandwidth modes include a 20 M bandwidth mode, a 40 M bandwidth mode, an 80 M bandwidth mode, and a 160 (80+80) M bandwidth mode. In this way, the receive end may reserve the available bandwidth based on the bandwidth mode, where the available bandwidth is used for the data communication between the receive end and the transmit end.

In a process of implementing this application, the inventor finds that the prior art has at least the following problem:

Currently, there are four bandwidth modes. However, with development of technologies, a new bandwidth mode emerges, and the new bandwidth mode cannot be sent to the receive end by using a current technology.

SUMMARY

To send a new bandwidth mode to a receive end, this application provides a bandwidth mode indication method and apparatus. The technical solutions are as follows:

According to a first aspect, an embodiment of this application provides a bandwidth mode indication method. The method includes: When a first device is an extremely high throughput (EHT) site, a second device generates a frame in a first non-high throughput non-HT format or a frame in a first non-high throughput duplicated non-HT duplicated format, where at least three bits in the first seven bits of a scrambling sequence of the frame in the first non-HT format indicate a bandwidth mode of a channel, or at least three bits in the first seven bits of a scrambling sequence of the frame in the first non-HT duplicated format indicate a bandwidth mode of a channel, and the channel is a channel between the first device and the second device; and the second device sends, to the first device, the frame in the first non-HT format or the frame in the first non-HT duplicated format. Alternatively, when a first device is a very high throughput VHT site or a high efficiency HE site that does not support an EHT, a second device generates a frame in a second non-HT format or a frame in a second non-HT duplicated format, where two bits in the first seven bits of a scrambling sequence of the frame in the second non-HT format indicate a bandwidth mode of a channel, or two bits in the first seven bits of a scrambling sequence of the frame in the second non-HT duplicated format indicate a bandwidth mode of a channel, and the channel is a channel between the first device and the second device; and the second device sends, to the first device, the frame in the second non-HT format or the frame in the second non-HT duplicated format. When the first device is the extremely high throughput EHT site, the at least three bits in the first seven bits of the scrambling sequence are used to indicate the bandwidth mode of the channel, and the at least three bits indicate more than four types of bandwidth modes, so that a new bandwidth mode can be indicated, and the new bandwidth mode is sent to the first device.

In a possible implementation of the first aspect, when three bits in the first seven bits of the scrambling sequence of the frame in the first non-HT format indicate the bandwidth mode of the channel, or three bits in the first seven bits of the scrambling sequence of the frame in the first non-HT duplicated format indicate the bandwidth mode of the channel, the three bits are the second bit, the third bit, and the fourth bit in the first seven bits of the scrambling sequence, or the three bits are the fourth bit, the sixth bit, and the seventh bit in the first seven bits of the scrambling sequence. The three bits may indicate more than four types of bandwidth modes, so that a new bandwidth mode can be indicated, and the new bandwidth mode is sent to the first device.

In another possible implementation of the first aspect, the channel includes one primary 20 MHz subchannel and M secondary 20 MHz subchannels, M is greater than or equal to 3, each of the at least three bits corresponds to at least one secondary subchannel, and a value of a bit corresponding to a secondary subchannel is used to indicate whether the secondary subchannel is available. A preamble puncture mode includes a plurality of modes. Because each of the at least three bits corresponds to at least one secondary subchannel, the plurality of modes included in the preamble puncture mode can be indicated to the first device.

In another possible implementation of the first aspect, when the value of the bit corresponding to the secondary subchannel is 1, the bit is used to indicate that the secondary subchannel is available, and when the value of the bit corresponding to the secondary subchannel is 0, the bit is used to indicate that the secondary subchannel is unavailable; or when the value of the bit corresponding to the secondary subchannel is 0, the bit is used to indicate that the secondary subchannel is available, and when the value of the bit corresponding to the secondary subchannel is 1, the bit is used to indicate that the secondary subchannel is unavailable.

According to a second aspect, an embodiment of this application provides a bandwidth mode indication method. The method includes: A second device generates a frame in a first non-high throughput non-HT format or a frame in a first non-high throughput duplicated non-HT duplicated format, where the frame in the first non-HT format includes first indication information, and the first indication information is used to indicate whether to use at least three bits in the first seven bits of a scrambling sequence of the frame in the first non-HT format to indicate a bandwidth mode; or the frame in the first non-HT duplicated format includes first indication information, and the first indication information is used to indicate whether to use at least three bits in the first seven bits of a scrambling sequence of the frame in the first non-HT duplicated format to indicate a bandwidth mode; and the second device sends, to a first device, the frame in the first non-HT format or the frame in the first non-HT duplicated format. In this way, the first device may determine, based on the first indication information, whether to use the at least three bits in the first seven bits of the scrambling sequence to indicate the bandwidth mode. The at least three bits in the first seven bits of the scrambling sequence are used to indicate the bandwidth mode of a channel, and the at least three bits indicate more than four types of bandwidth modes, so that a new bandwidth mode can be indicated, and the new bandwidth mode is sent to the first device.

In a possible implementation of the second aspect, the first indication information is a globally unique/locally executed bit in a transmitter address field of the frame in the first non-HT format, or a unicast/broadcast bit in a receiver address field of the frame in the first non-HT format, or a to distributed system ToDS field, a from distributed system FromDS field, or a retry field in a frame control field of the frame in the first non-HT format.

In a possible implementation of the second aspect, the first indication information is a globally unique/locally executed bit in a transmitter address field of the frame in the first non-HT duplicated format, or a unicast/broadcast bit in a receiver address field of the frame in the first non-HT duplicated format, or a ToDS field, a FromDS field, or a retry field in a frame control field of the frame in the first non-HT duplicated format.

In a possible implementation of the second aspect, when three bits in the first seven bits of the scrambling sequence of the frame in the first non-HT format indicate the bandwidth mode of the channel, or three bits in the first seven bits of the scrambling sequence of the frame in the first non-HT duplicated format indicate the bandwidth mode of the channel, the three bits are the second bit, the third bit, and the fourth bit in the first seven bits of the scrambling sequence, or the three bits are the fourth bit, the sixth bit, and the seventh bit in the first seven bits of the scrambling sequence.

In another possible implementation of the second aspect, the channel includes one primary 20 MHz subchannel and M secondary 20 MHz subchannels, M is greater than or equal to 3, each of the at least three bits corresponds to at least one secondary subchannel, and a value of a bit corresponding to a secondary subchannel is used to indicate whether the secondary subchannel is available. A preamble puncture mode includes a plurality of modes. Because each of the at least three bits corresponds to at least one secondary subchannel, the plurality of modes included in the preamble puncture mode can be indicated to the first device.

In another possible implementation of the second aspect, when the value of the bit corresponding to the secondary subchannel is 1, the bit is used to indicate that the secondary subchannel is available, and when the value of the bit corresponding to the secondary subchannel is 0, the bit is used to indicate that the secondary subchannel is unavailable; or when the value of the bit corresponding to the secondary subchannel is 0, the bit is used to indicate that the secondary subchannel is available, and when the value of the bit corresponding to the secondary subchannel is 1, the bit is used to indicate that the secondary subchannel is unavailable.

According to a third aspect, an embodiment of this application provides a channel indication method. The method includes: A first device receives, from a second device, a request to send advanced RTS-A frame in a first non-high throughput non-HT format or an RTS-A frame in a first non-high throughput duplicated non-HT duplicated format, where each of at least three bits in the first seven bits of a scrambling sequence of the RTS-A frame in the first non-HT format corresponds to at least one secondary subchannel of a channel, or each of at least three bits in the first seven bits of a scrambling sequence of the RTS-A frame in the first non-HT duplicated format corresponds to at least one secondary subchannel of a channel, the channel is a channel between the first device and the second device, and a value of a bit corresponding to a secondary subchannel is used to indicate whether the secondary subchannel is available; the first device detects status information of each subchannel included in the channel; the first device generates a clear to send advanced CTS-A frame based on the RTS-A frame in the first non-HT format and the status information of each subchannel included in the channel, or generates a CTS-A frame based on the RTS-A frame in the first non-HT duplicated format and the status information of each subchannel included in the channel, where the CTS-A frame includes a bitmap, and when the RTS-A frame in the first non-HT format or the RTS-A frame in the first non-HT duplicated format indicates that a subchannel is available and a channel state of the subchannel is idle, a bit corresponding to the subchannel in the bitmap is set to 1; otherwise, the bit corresponding to the subchannel in the bitmap is set to 0; and the first device sends, to the second device, the CTS-A frame in the first non-HT format or the CTS-A frame in the first non-HT duplicated format on a subchannel corresponding to a bit whose value is 1 in the bitmap. Through interaction using the RTS-A/CTS-A frame, the first device and the second device negotiate subchannels used for data communication, that is, a primary 20 MHz channel and the subchannel corresponding to the bit whose value is set to 1 in the bitmap of the CTS-A frame.

In a possible implementation of the RTS-A frame in the third aspect, the RTS-A frame is an RTS frame that uses at least three bits in the first seven bits of a scrambling sequence to carry bandwidth information.

In another possible implementation of the RTS-A frame in the third aspect, the RTS-A frame is a frame of a new type or a new trigger frame, a bitmap is carried in the RTS-A frame, and each bit in the bitmap corresponds to one 20 MHz subchannel.

In a possible implementation of the CTS-A frame in the third aspect, the CTS-A frame is a CTS frame.

In another possible implementation of the CTS-A frame in the third aspect, the CTS-A frame is a frame that carries an A-Control field of a BQR.

In still another possible implementation of the CTS-A frame in the third aspect, the CTS-A frame is a frame that carries a new type of A-Control field.

According to a fourth aspect, an embodiment of this application provides a bandwidth mode indication apparatus, configured to perform the method according to any one of the first aspect or the possible implementations of the first aspect. Specifically, the apparatus includes units configured to perform the method according to any one of the first aspect or the possible implementations of the first aspect.

According to a fifth aspect, an embodiment of this application provides a bandwidth mode indication apparatus, configured to perform the method according to any one of the second aspect or the possible implementations of the second aspect. Specifically, the apparatus includes units configured to perform the method according to any one of the second aspect or the possible implementations of the second aspect.

According to a sixth aspect, an embodiment of this application provides a channel indication apparatus, configured to perform the method according to any one of the third aspect or the possible implementations of the third aspect. Specifically, the apparatus includes units configured to perform the method according to any one of the third aspect or the possible implementations of the third aspect.

According to a seventh aspect, an embodiment of this application provides a bandwidth mode indication apparatus. The apparatus includes an input interface, an output interface, a processor, and a memory. The input/output interface, the processor, and the memory may be connected through a bus system. The memory is configured to store a program, an instruction, or code. The processor is configured to execute the program, the instruction, or the code in the memory, to complete the method according to any one of the first aspect, the second aspect, the possible implementations of the first aspect, or the possible implementations of the second aspect.

According to an eighth aspect, an embodiment of this application provides a channel indication apparatus. The apparatus includes an input interface, an output interface, a processor, and a memory. The input/output interface, the processor, and the memory may be connected through a bus system. The memory is configured to store a program, an instruction, or code. The processor is configured to execute the program, the instruction, or the code in the memory, to complete the method according to any one of the third aspect or the possible implementations of the third aspect.

According to a ninth aspect, an embodiment of this application provides a computer program product. The computer program product includes a computer program stored in a computer-readable storage medium, and the computer program is loaded by a processor to implement the method according to any one of the first aspect, the second aspect, the third aspect, the possible implementations of the first aspect, the possible implementations of the second aspect, or the possible implementations of the third aspect.

According to a tenth aspect, an embodiment of this application provides a computer-readable storage medium. The computer-readable storage medium is configured to store a computer program, and the computer program is loaded by a processor to execute an instruction of the method according to any one of the first aspect, the second aspect, the third aspect, the possible implementations of the first aspect, the possible implementations of the second aspect, or the possible implementations of the third aspect.

According to an eleventh aspect, an embodiment of this application provides a chip. The chip includes a programmable logic circuit and/or a program instruction; and when the chip runs, the method according to any one of the first aspect, the second aspect, the third aspect, the possible implementations of the first aspect, the possible implementations of the second aspect, or the possible implementations of the third aspect is implemented.

BRIEF DESCRIPTION OF THE DRAWINGS

FIG. 1-2 is a schematic structural diagram of another communications system according to an embodiment of this application;

FIG. 2-1 is a flowchart of a bandwidth mode indication method according to an embodiment of this application;

FIG. 2-2 is a schematic diagram of puncturing on a channel according to an embodiment of this application;

FIG. 3-1 is a flowchart of another bandwidth mode indication method according to an embodiment of this application;

FIG. 3-2 is a schematic structural diagram of an address field according to an embodiment of this application;

FIG. 3-3 is a schematic structural diagram of a frame control field according to an embodiment of this application;

DETAILED DESCRIPTION OF ILLUSTRATIVE EMBODIMENTS

The following further describes in detail embodiments of this application with reference to the accompanying drawings.

Figure 1:
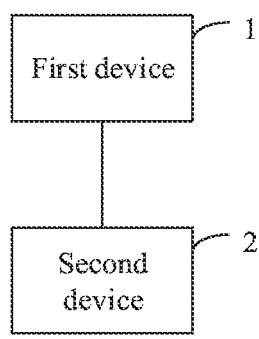
FIG. 1-1 is a schematic structural diagram of a communications system according to an embodiment of this application.

Referring to FIG. 1-1, an embodiment of this application provides a communications system. The communications system includes: a first device 1 and a second device 2. There is at least one channel between the first device 1 and the second device 2, and each of the at least one channel corresponds to one bandwidth mode.

For example, bandwidth modes may include a 20 M bandwidth mode, a 40 M bandwidth mode, an 80 M bandwidth mode, a 160 (80+80) M bandwidth mode, a 240 M bandwidth mode, and a 320 M bandwidth mode. A bandwidth of a channel corresponding to the 20 M bandwidth mode is 20 MHz, a bandwidth of a channel corresponding to the 40 M bandwidth mode is 40 MHz, a bandwidth of a channel corresponding to the 80 M bandwidth mode is 80 MHz, a bandwidth of a channel corresponding to the 160 M bandwidth mode is 160 MHz, a bandwidth of a channel corresponding to the 240 M bandwidth mode is 240 MHz, and a bandwidth of a channel corresponding to the 320 M bandwidth mode is 320 MHz.

Each channel includes at least one subchannel, bandwidths of subchannels may be the same or may be different, and a bandwidth of each subchannel may be greater than or equal to 20 MHz. For each channel, in at least one subchannel included in the channel, one subchannel is a primary subchannel, and another subchannel is a secondary subchannel.

Figures 1, 2:
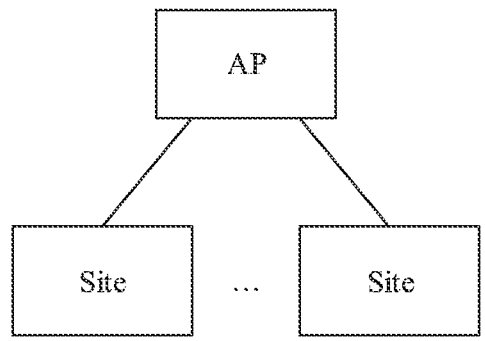
Figures 1, 2:
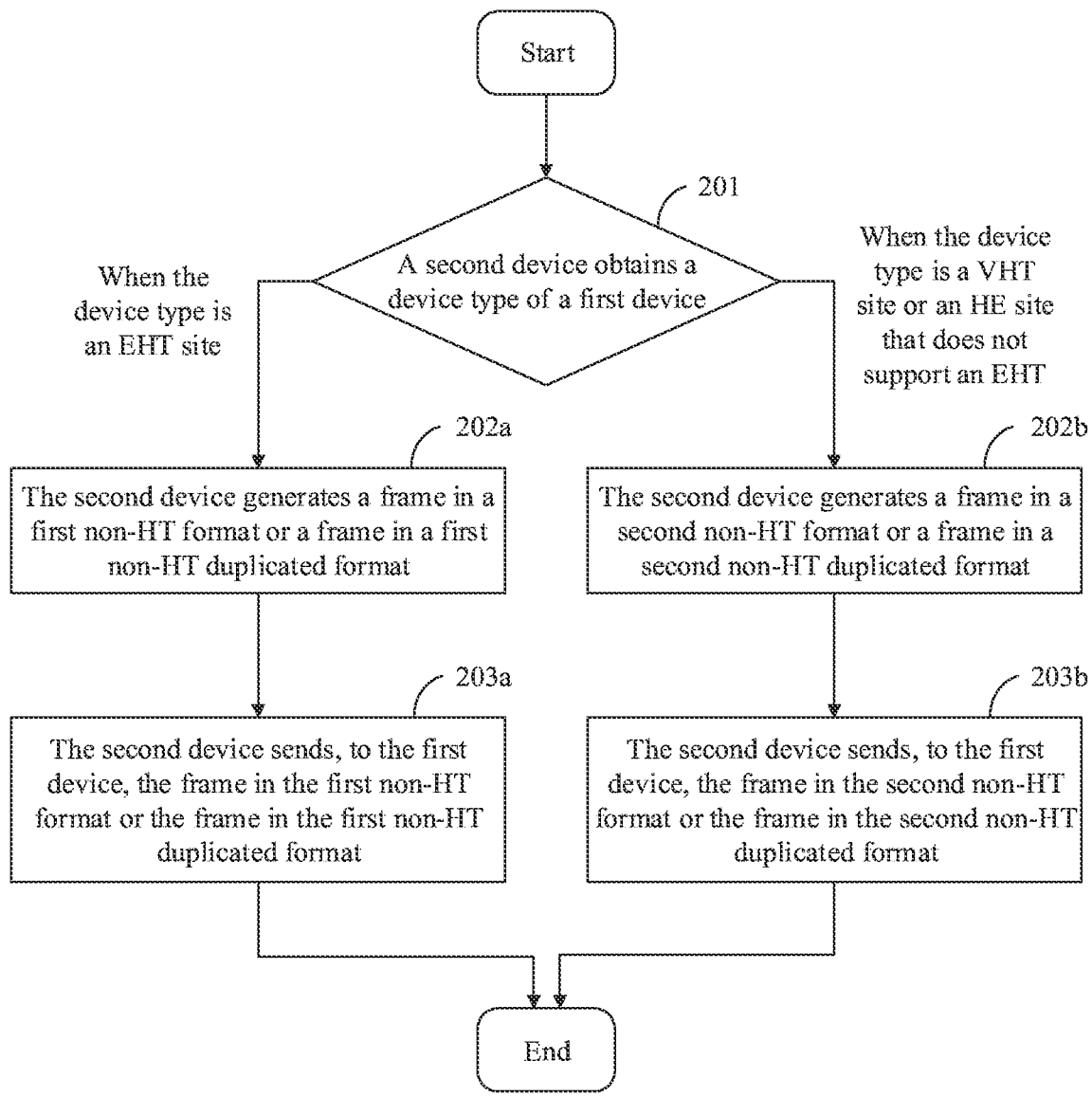
Figure 2:

Optionally, referring to FIG. 1-2, the system may be a communications system including an access point (AP) and at least one site. The first device 1 may be an AP, and the second device 2 may be any site. Alternatively, the first device 1 may be any site, and the second device 2 may be an AP. Alternatively, the first device 1 and the second device 2 may be two different sites.

Referring to FIG. 2-1, an embodiment of this application provides a bandwidth mode indication method. The method may be applied to the communications system shown in FIG. 1-1 or FIG. 1-2, and the method includes the following steps.

Step 201: A second device obtains a device type of a first device.

When the second device is associated with the first device, the first device sends the device type of the first device to the second device, and the second device sends a device type of the second device to the first device. Therefore, before this step is performed, the first device and the second device each store a device type of the peer party.

In this step, the second device may obtain the device type that is of the first device and that is stored by the second device.

Optionally, the device type may be an extremely high throughput (EHT) site, or the device type may be a very high throughput (VHT) site or a high efficiency (HE) site that does not support an EHT.

For a first device whose device type is an EHT site, the first device supports use of at least three bits in the first seven bits of a scrambling sequence to indicate a bandwidth mode of a channel, or may support use of two bits in the first seven bits of a scrambling sequence to indicate a bandwidth mode. For a first device whose device type is a VHT site or an HE site that does not support an EHT, the first device supports use of two bits in the first seven bits of a scrambling sequence to indicate a bandwidth mode.

The device type of the second device is an EHT site.

In this embodiment of this application, it may be specified in a standard or the second device and the first device may agree in advance that the second device uses the at least three bits in the first seven bits of the scrambling sequence to indicate the bandwidth mode when the first device is the EHT site, and the second device uses the two bits in the first seven bits of the scrambling sequence to indicate the bandwidth mode when the first device is the VHT site or the HE site that does not support the EHT.

The channel is any channel between the second device and the first device. There may be at least one channel between the second device and the first device, and each of the at least one channel corresponds to one bandwidth mode. In addition to four types of bandwidth modes: a 20 M bandwidth mode, a 40 M bandwidth mode, an 80 M bandwidth mode, and a 160 M bandwidth mode, bandwidth modes may further include new bandwidth modes such as a 240 M bandwidth mode and a 320 M bandwidth mode.

Optionally, for any channel between the second device and the first device, the channel includes at least one subchannel, and in the at least one subchannel, one subchannel is a primary subchannel, and another subchannel is a secondary subchannel.

Step 202a: When the device type of the first device is the EHT site, the second device generates a frame in a first non-high throughput (non-HT) format or a frame in a first non-high throughput duplicated (non-HT duplicated) format.

At least three bits in the first seven bits of a scrambling sequence of the frame in the first non-HT format indicate a bandwidth mode of a channel, or at least three bits in the first seven bits of a scrambling sequence of the frame in the first non-HT duplicated format indicate a bandwidth mode of a channel, and the channel is a channel between the first device and the second device.

When the channel includes one subchannel, the second device generates the frame in the first non-HT format. When the channel includes a plurality of subchannels, the second device generates the frame in the first non-HT duplicated format.

For example, in addition to four types of bandwidth modes: the 20 M bandwidth mode, the 40 M bandwidth mode, the 80 M bandwidth mode, and the 160 (80+80) M bandwidth mode, current bandwidth modes further include new bandwidth modes such as the 240 M bandwidth mode and the 320 M bandwidth mode. In this step, the at least three bits in the first seven bits of the scrambling sequence of the frame in the first non-HT format are used to indicate the bandwidth mode of the channel, or the at least three bits in the first seven bits of the scrambling sequence of the frame in the first non-HT duplicated format are used to indicate the bandwidth mode of the channel. Therefore, more than four types of bandwidth modes can be indicated by using the at least three bits. In other words, in addition to the four types of bandwidth modes: the 20 M bandwidth mode, the 40 M bandwidth mode, the 80 M bandwidth mode, and the 160 (80+80) M bandwidth mode, bandwidth modes that can be indicated by using the at least three bits may further include the new bandwidth modes such as the 240 M bandwidth mode and/or the 320 M bandwidth mode.

In this embodiment, three bits in the first seven bits of the scrambling sequence may be used to indicate the bandwidth mode of the channel. The first seven bits of the scrambling sequence are $B_0B_1B_2B_3B_4B_5B_6$, and the first seven bits of the scrambling sequence include the first bit $B_0$, the second bit $B_1$, the third bit $B_2$, the fourth bit $B_3$, the fifth bit $B_4$, the sixth bit $B_5$, and the seventh bit $B_6$. For any one of bandwidth modes such as the 20 M bandwidth mode, the 40 M bandwidth mode, the 80 M bandwidth mode, the 160 (80+80) M bandwidth mode, the 240 M bandwidth mode, and the 320 M bandwidth mode, referring to Table 1, the second bit $B_1$, the third bit $B_2$, and the fourth bit $B_3$ in the first seven bits of the scrambling sequence may be used to indicate the any one of the bandwidth modes. Alternatively, referring to Table 2, the fourth bit $B_3$, the sixth bit $B_5$, and the seventh bit $B_6$ in the first seven bits of the scrambling sequence may be used to indicate the any one of the bandwidth modes.

TABLE 1

| $B_1$ | $B_2$ | $B_3$ | Bandwidth mode |
|---|---|---|---|
| 0 | 0 | 0 | 20M bandwidth mode |
| 0 | 0 | 1 | 40M bandwidth mode |
| 0 | 1 | 0 | 80M bandwidth mode |
| 0 | 1 | 1 | 160 (80 + 80) M bandwidth mode |
| 1 | 0 | 0 | 240M bandwidth mode |
| 1 | 0 | 1 | 320M bandwidth mode |
| ... | ... | ... | ... |

TABLE 2

| $B_3$ | $B_5$ | $B_6$ | Bandwidth mode |
|---|---|---|---|
| 0 | 0 | 0 | 20M bandwidth mode |
| 0 | 0 | 1 | 40M bandwidth mode |

TABLE 2-continued

| B$_3$ | B$_5$ | B$_6$ | Bandwidth mode |
|---|---|---|---|
| 0 | 1 | 0 | 80M bandwidth mode |
| 0 | 1 | 1 | 160 (80 + 80) M bandwidth mode |
| 1 | 0 | 0 | 240M bandwidth mode |
| 1 | 0 | 1 | 320M bandwidth mode |
| ... | ... | ... | ... |

Optionally, for a channel, between the first device and the second device, whose bandwidth is greater than or equal to 80 MHz, where the channel includes one primary subchannel and M secondary subchannels, and M is greater than or equal to 3, a bandwidth of the primary subchannel may be greater than or equal to 20 MHz, and a bandwidth of each secondary subchannel may be greater than or equal to 20 MHz. A bandwidth mode of the channel may alternatively be a preamble puncture mode. In the preamble puncture mode, at least one secondary subchannel of the channel is unavailable.

Before the second device performs data communication with the first device, the second device may perform puncturing on the channel. A subchannel that is punctured is a secondary subchannel, and the secondary subchannel that is punctured is unavailable, that is, cannot be used for the data communication. A subchannel that is not punctured is available, that is, can be used for the data communication.

Referring to FIG. 2-2, the preamble puncture mode may be further classified into the following first mode, second mode, third mode, and fourth mode.

In the first mode, puncturing is performed on an 80 MHz channel, and only a secondary 20 MHz channel (an S20 channel) is punctured.

In the second mode, puncturing is performed on an 80 MHz channel, and only a 20 MHz channel in a secondary 40 MHz channel (an S40-low or S40-high channel) is punctured.

In the third mode, puncturing is performed on a 160 MHz channel or an (80+80) MHz channel, only a secondary 20 MHz channel (an S20 channel) is punctured on a primary 80 MHz channel, and random puncturing may be performed on a secondary 80 MHz channel at a granularity of 20 MHz.

In the fourth mode, puncturing is performed on a 160 MHz channel or an (80+80) MHz channel, a primary 40 MHz channel on a primary 80 MHz channel is available, and random puncturing may be performed on a secondary 40 MHz channel and a secondary 80 MHz channel at a granularity of 20 MHz.

Optionally, in this step, the at least three bits in the first seven bits of the scrambling sequence may be used to indicate the preamble puncture mode of the channel. During implementation, each of the at least three bits corresponds to at least one secondary subchannel, and a value of a bit corresponding to a secondary subchannel is used to indicate whether the secondary subchannel is available.

Optionally, when the value of the bit corresponding to the secondary subchannel is 1, the bit is used to indicate that the secondary subchannel is available, and when the value of the bit corresponding to the secondary subchannel is 0, the bit is used to indicate that the secondary subchannel is unavailable; or when the value of the bit corresponding to the secondary subchannel is 0, the bit is used to indicate that the secondary subchannel is available, and when the value of the bit corresponding to the secondary subchannel is 1, the bit is used to indicate that the secondary subchannel is unavailable.

When a bandwidth indicated by using the first seven bits of the scrambling sequence does not exceed 160 MHz, seven bits are used for indication, where each bit corresponds to one 20 MHz subchannel other than a primary 20 MHz subchannel, and 20 MHz subchannels respectively corresponding to B0 to B7 are arranged in ascending order of frequencies.

For example, referring to FIG. 2-2, it is assumed that the second device punctures a secondary subchannel S20, the secondary subchannel S20 is unavailable, and a primary channel P20, a secondary subchannel S40-low, and a secondary subchannel S40-high are all available. In this case, the first seven bits of the scrambling sequence are used to indicate the preamble puncture mode of the channel, where B0=0, B1=1, B2=1, B3=0, B4=0, B5=0, and B6=0. The first bit B0 corresponds to the secondary subchannel S20, the second bit B1 corresponds to the secondary subchannel S40-low, the third bit B2 corresponds to the secondary subchannel S40-high, and B3 to B6 correspond to four 20 MHz channels in a secondary 80 MHz channel.

When the bandwidth indicated by using the first seven bits of the scrambling sequence exceeds 160 MHz, each bit corresponds to one or more 20 MHz subchannels other than a primary 20 MHz subchannel. For example, when a total bandwidth is 320 MHz, five bits may be used for indication, where one bit indicates a secondary 20 MHz subchannel, one bit indicates a secondary 40 MHz subchannel, and the other three bits indicate three 80 MHz subchannels that do not include a primary 20 MHz subchannel.

Step 203a: The second device sends, to the first device, the frame in the first non-HT format or the frame in the first non-HT duplicated format, and the procedure ends.

The first device receives the frame in the first non-HT format or the frame in the first non-HT duplicated format, obtains the at least three bits in the first seven bits of the scrambling sequence of the frame in the first non-HT format, and determines the bandwidth mode of the channel that is indicated by using the at least three bits; or the first device obtains the at least three bits in the first seven bits of the scrambling sequence of the frame in the first non-HT duplicated format, and determines the bandwidth mode of the channel that is indicated by using the at least three bits.

Step 202b: When the device type of the first device is the VHT site or the HE site that does not support the EHT, the second device generates a frame in a second non-HT format or a frame in a second non-HT duplicated format.

Two bits in the first seven bits of a scrambling sequence of the frame in the second non-HT format indicate a bandwidth mode of a channel, or two bits in the first seven bits of a scrambling sequence of the frame in the second non-HT duplicated format indicate a bandwidth mode of a channel, and the channel is a channel between the first device and the second device.

Optionally, the bandwidth mode indicated by using the two bits may be any one of the 20 M bandwidth mode, the 40 M bandwidth mode, the 80 M bandwidth mode, and the 160 (80+80) M bandwidth mode.

The first seven bits of the scrambling sequence are B0B1B2B3B4B5B6, and the first seven bits of the scrambling sequence include the first bit B0, the second bit B1, the third bit B2, the fourth bit B3, the fifth bit B4, the sixth bit B5, and the seventh bit B6. Referring to Table 3, in this step, the sixth bit B5 and the seventh bit B6 are used to indicate any one of the 20 M bandwidth mode, the 40 M bandwidth mode, the 80 M bandwidth mode, and the 160 (80+80) M bandwidth mode.

TABLE 3

| $B_5$ | $B_6$ | Bandwidth mode |
|---|---|---|
| 0 | 0 | 20M bandwidth mode |
| 0 | 1 | 40M bandwidth mode |
| 1 | 0 | 80M bandwidth mode |
| 1 | 1 | 160 (80 + 80) M bandwidth mode |

Step 203b: The second device sends, to the first device, the frame in the second non-HT format or the frame in the second non-HT duplicated format.

The first device receives the frame in the second non-HT format or the frame in the second non-HT duplicated format, obtains the two bits in the first seven bits of the scrambling sequence of the frame in the second non-HT format, and determines the bandwidth mode of the channel that is indicated by using the two bits; or the first device obtains the two bits in the first seven bits of the scrambling sequence of the frame in the second non-HT duplicated format, and determines the bandwidth mode of the channel that is indicated by using the two bits.

Optionally, the frame in the first non-HT format, the frame in the first non-HT duplicated format, the frame in the second non-HT format, and the frame in the second non-HT duplicated format may all be request to send (RTS) frames.

In this embodiment of this application, steps 202a and 203a and steps 202b and 203b are two parallel and independent processes.

In this embodiment of this application, when the device type of the second device is the EHT site, the at least three bits in the first seven bits of the scrambling sequence of the frame that is in the first non-HT format and that is generated by the second device indicate the bandwidth mode of the channel, or the at least three bits in the first seven bits of the scrambling sequence of the frame that is in the first non-HT duplicated format and that is generated by the second device indicate the bandwidth mode of the channel. Because the at least three bits can indicate more than four types of bandwidth modes, bandwidth modes that can be indicated to the first device by using the at least three bits include not only the four types of bandwidth modes: the 20 M bandwidth mode, the 40 M bandwidth mode, the 80 M bandwidth mode, and the 160 (80+80) M bandwidth mode, but also the new bandwidth modes such as the 240 M bandwidth mode and/or the 320 M bandwidth mode.

Referring to FIG. 3-1, an embodiment of this application provides a bandwidth mode indication method. The method may be applied to the communications system shown in FIG. 1-1 or FIG. 1-2, and the method includes the following steps.

Step 301: A second device generates a frame in a first non-HT format or a frame in a first non-HT duplicated format.

At least three bits in the first seven bits of a scrambling sequence of the frame in the first non-HT format indicate a bandwidth mode of a channel, and the frame in the first non-HT format includes first indication information, where the first indication information is used to indicate whether to use the at least three bits in the first seven bits of the scrambling sequence of the frame in the first non-HT format to indicate the bandwidth mode; or at least three bits in the first seven bits of a scrambling sequence of the frame in the first non-HT duplicated format indicate a bandwidth mode of a channel, and the frame in the first non-HT duplicated format includes first indication information, where the first indication information is used to indicate whether to use the at least three bits in the first seven bits of the scrambling sequence of the frame in the first non-HT duplicated format to indicate the bandwidth mode; and the channel is a channel between a first device and the second device.

For a frame in a non-HT duplicated format or a frame in a non-HT format, when the channel includes one subchannel, the second device generates the frame in the first non-HT format; or when the channel includes a plurality of subchannels, the second device generates the frame in the first non-HT duplicated format.

When the second device needs to perform data communication with the first device, the second device performs the method in this embodiment to indicate the bandwidth mode of the channel to the first device. The second device is an EHT site, and the first device may be an EHT site, or the first device may be a VHT site or an HE site that does not support an EHT.

In this embodiment, the frame that is in the first non-HT format and that is generated by the second device includes the first indication information, or the frame that is in the first non-HT duplicated format and that is generated by the second device includes the first indication information, and the first indication information is used to notify the first device of whether to use the at least three bits in the first seven bits of the scrambling sequence to indicate the bandwidth mode.

Optionally, the first indication information may be a globally unique/locally executed bit in a transmitter address field of the frame in the first non-HT format, or a unicast/broadcast bit in a receiver address field of the frame in the first non-HT format, or a to distributed system (ToDS) field, a from distributed system (FromDS) field, or a retry field in a frame control field of the frame in the first non-HT format.

Referring to a transmitter address field or a receiver address field that is of the frame in the first non-HT format and that is shown in FIG. 3-2, the transmitter address field or the receiver address field includes six bytes. The first byte includes bits b0, b1, b2, b3, b4, b5, b6, and b7.

When FIG. 3-2 shows the transmitter address field, the bit b1 in the first byte of the transmitter address field is a globally unique/locally executed bit, that is, the first indication information is the bit b1. For example, b1=1 indicates that the at least three bits in the first seven bits of the scrambling sequence are used to indicate the bandwidth mode. When FIG. 3-2 shows the receiver address field, the bit b0 in the first byte of the receiver address field is a unicast/broadcast bit, that is, the first indication information is the bit b0. For example, b0=1 indicates that the at least three bits in the first seven bits of the scrambling sequence are used to indicate the bandwidth mode.

Referring to a frame control field that is of the frame in the first non-HT format and that is shown in FIG. 3-3, the frame control field includes a protocol version field, a type field, a subtype field, a ToDS field, a FromDS field, a more fragments field, a retry field, a power management field, a more data field, a protected frame field, and a +HTC/order field. The ToDS field, the FromDS field, and the retry field are always set to 0 in a current Wi-Fi standard (802.11ax or an earlier standard). Therefore, the ToDS field, the FromDS field, or the retry field may be reused in this patent. For example, ToDS=1, FromDS=1, or retry=1 indicates that the at least three bits in the first seven bits of the scrambling sequence are used to indicate the bandwidth mode; and ToDS=0, FromDS=0, or retry=0 indicates that the at least three bits in the first seven bits of the scrambling sequence are not used to indicate the bandwidth mode.

Optionally, the first indication information may be a globally unique/locally executed bit in a transmitter address field of the frame in the first non-HT duplicated format, or a unicast/broadcast bit in a receiver address field of the frame in the first non-HT duplicated format, or a ToDS field, a FromDS field, or a retry field in a frame control field of the frame in the first non-HT duplicated format.

For the transmitter address field, the receiver address field, and the frame control field of the frame in the first non-HT duplicated format, refer to the foregoing descriptions of the transmitter address field, the receiver address field, and the frame control field of the frame in the first non-HT format, and details are not described herein again.

Optionally, there may be at least one channel between the second device and the first device, and each of the at least one channel corresponds to one bandwidth mode. In addition to four types of bandwidth modes: a 20 M bandwidth mode, a 40 M bandwidth mode, an 80 M bandwidth mode, and a 160 M bandwidth mode, bandwidth modes may further include new bandwidth modes such as a 240 M bandwidth mode and a 320 M bandwidth mode.

In this step, the at least three bits in the first seven bits of the scrambling sequence of the frame in the first non-HT format are used to indicate the bandwidth mode of the channel, or the at least three bits in the first seven bits of the scrambling sequence of the frame in the first non-HT duplicated format are used to indicate the bandwidth mode of the channel. Therefore, more than four types of bandwidth modes can be indicated by using the at least three bits. In other words, in addition to the four types of bandwidth modes: the 20 M bandwidth mode, the 40 M bandwidth mode, the 80 M bandwidth mode, and the 160 (80+80) M bandwidth mode, bandwidth modes that can be indicated by using the at least three bits may further include the new bandwidth modes such as the 240 M bandwidth mode and/or the 320 M bandwidth mode.

In this embodiment, three bits in the first seven bits of the scrambling sequence may be used to indicate the bandwidth mode of the channel. For example, the first seven bits of the scrambling sequence are B0B1B2B3B4B5B6, and the first seven bits of the scrambling sequence include the first bit B0, the second bit B1, the third bit B2, the fourth bit B3, the fifth bit B4, the sixth bit B5, and the seventh bit B6. For any one of bandwidth modes such as the 20 M bandwidth mode, the 40 M bandwidth mode, the 80 M bandwidth mode, the 160 (80+80) M bandwidth mode, the 240 M bandwidth mode, and the 320 M bandwidth mode, the second bit B1, the third bit B2, and the fourth bit B3 in the first seven bits of the scrambling sequence may be used to indicate the any one of the bandwidth modes. Alternatively, the fourth bit B3, the sixth bit B5, and the seventh bit B6 in the first seven bits of the scrambling sequence may be used to indicate the any one of the bandwidth modes.

Optionally, for a channel, between the first device and the second device, whose bandwidth is greater than 80 M, where the channel includes one primary subchannel and M secondary subchannels, and M is greater than or equal to 3, a bandwidth of the primary subchannel may be greater than or equal to 20 MHz, and a bandwidth of each secondary subchannel may be greater than or equal to 20 MHz. The bandwidth mode of the channel may alternatively be a preamble puncture mode. In the preamble puncture mode, at least one secondary subchannel of the channel is unavailable.

Before the second device performs the data communication with the first device, the second device may perform puncturing on the channel. A subchannel that is punctured is a secondary subchannel, and the secondary subchannel that is punctured is unavailable, that is, cannot be used for the data communication. A subchannel that is not punctured is available, that is, can be used for the data communication.

Referring to FIG. 2-2, the preamble puncture mode may be further classified into the following first mode, second mode, third mode, and fourth mode.

In the first mode, puncturing is performed on an 80 MHz channel, and only a secondary 20 MHz channel (an S20 channel) is punctured.

In the second mode, puncturing is performed on an 80 MHz channel, and only a 20 MHz channel in a secondary 40 MHz channel (an S40-low or S40-high channel) is punctured.

In the third mode, puncturing is performed on a 160 MHz channel or an (80+80) MHz channel, only a secondary 20 MHz channel (an S20 channel) is punctured on a primary 80 MHz channel, and random puncturing may be performed on a secondary 80 MHz channel at a granularity of 20 MHz.

In the fourth mode, puncturing is performed on a 160 MHz channel or an (80+80) MHz channel, a primary 40 MHz channel on a primary 80 MHz channel is available, and random puncturing may be performed on a secondary 40 MHz channel and a secondary 80 MHz channel at a granularity of 20 MHz.

Optionally, in this step, the at least three bits in the first seven bits of the scrambling sequence may be used to indicate the preamble puncture mode of the channel. During implementation, each of the at least three bits corresponds to at least one secondary subchannel, and a value of a bit corresponding to a secondary subchannel is used to indicate whether the secondary subchannel is available.

Optionally, when the value of the bit corresponding to the secondary subchannel is 1, the bit is used to indicate that the secondary subchannel is available, and when the value of the bit corresponding to the secondary subchannel is 0, the bit is used to indicate that the secondary subchannel is unavailable; or when the value of the bit corresponding to the secondary subchannel is 0, the bit is used to indicate that the secondary subchannel is available, and when the value of the bit corresponding to the secondary subchannel is 1, the bit is used to indicate that the secondary subchannel is unavailable.

When a bandwidth indicated by using the first seven bits of the scrambling sequence does not exceed 160 MHz, seven bits are used for indication, where each bit corresponds to one 20 MHz subchannel other than a primary 20 MHz subchannel, and 20 MHz subchannels respectively corresponding to B0 to B7 are arranged in ascending order of frequencies.

For example, referring to FIG. 2-2, it is assumed that the second device punctures a secondary subchannel S20, the secondary subchannel S20 is unavailable, and a primary channel P20, a secondary subchannel S40-low, and a secondary subchannel S40-high are all available. In this case, the first seven bits of the scrambling sequence are used to indicate the preamble puncture mode of the channel, where B0=0, B1=1, B2=1, B3=0, B4=0, B5=0, and B6=0. The first bit B0 corresponds to the secondary subchannel S20, the second bit B1 corresponds to the secondary subchannel S40-low, the third bit B2 corresponds to the secondary subchannel S40-high, and B3 to B6 correspond to four 20 MHz channels in a secondary 80 MHz channel.

When the bandwidth indicated by using the first seven bits of the scrambling sequence exceeds 160 MHz, each bit corresponds to one or more 20 MHz subchannels other than a primary 20 MHz subchannel. For example, when a total bandwidth is 320 MHz, five bits may be used for indication, where one bit indicates a secondary 20 MHz subchannel, one bit indicates a secondary 40 MHz subchannel, and the other three bits indicate three 80 MHz subchannels that do not include a primary 20 MHz subchannel.

Step 302: The second device sends, to the first device, the frame in the first non-HT format or the frame in the first non-HT duplicated format.

The first device receives the frame in the first non-HT format or the frame in the first non-HT duplicated format, obtains the first indication information included in the frame in the first non-HT format, determines, based on the first indication information, that the at least three bits in the first seven bits of the scrambling sequence of the frame in the first non-HT format indicate the bandwidth mode of the channel, obtains the at least three bits from the first seven bits of the scrambling sequence of the frame in the first non-HT format, and determines the bandwidth mode of the channel that is indicated by using the at least three bits; or the first device obtains the first indication information included in the frame in the first non-HT duplicated format, determines, based on the first indication information, that the at least three bits in the frame in the first non-HT duplicated format indicate the bandwidth mode of the channel, obtains the at least three bits from the first seven bits of the scrambling sequence of the frame in the first non-HT duplicated format, and determines the bandwidth mode of the channel that is indicated by using the at least three bits.

Optionally, the frame in the first non-HT format, the frame in the first non-HT duplicated format, the frame in the non-HT format, and the frame in the non-HT duplicated format may all be RTS frames.

In this embodiment of this application, the at least three bits in the first seven bits of the scrambling sequence of the frame that is in the first non-HT format and that is generated by the second device indicate the bandwidth mode of the channel, and the frame in the first non-HT format includes the first indication information; or the at least three bits in the first seven bits of the scrambling sequence of the frame that is in the first non-HT duplicated format and that is generated by the second device indicate the bandwidth mode of the channel, and the frame in the first non-HT duplicated format includes the first indication information. In this way, the first device may determine, based on the first indication information, that the at least three bits in the first seven bits of the scrambling sequence indicate the bandwidth mode. Because the at least three bits can indicate more than four types of bandwidth modes, bandwidth modes that can be indicated to the first device by using the at least three bits include not only the four types of bandwidth modes: the 20 M bandwidth mode, the 40 M bandwidth mode, the 80 M bandwidth mode, and the 160 (80+80) M bandwidth mode, but also the new bandwidth modes such as the 240 M bandwidth mode and/or the 320 M bandwidth mode.

Figure 4:
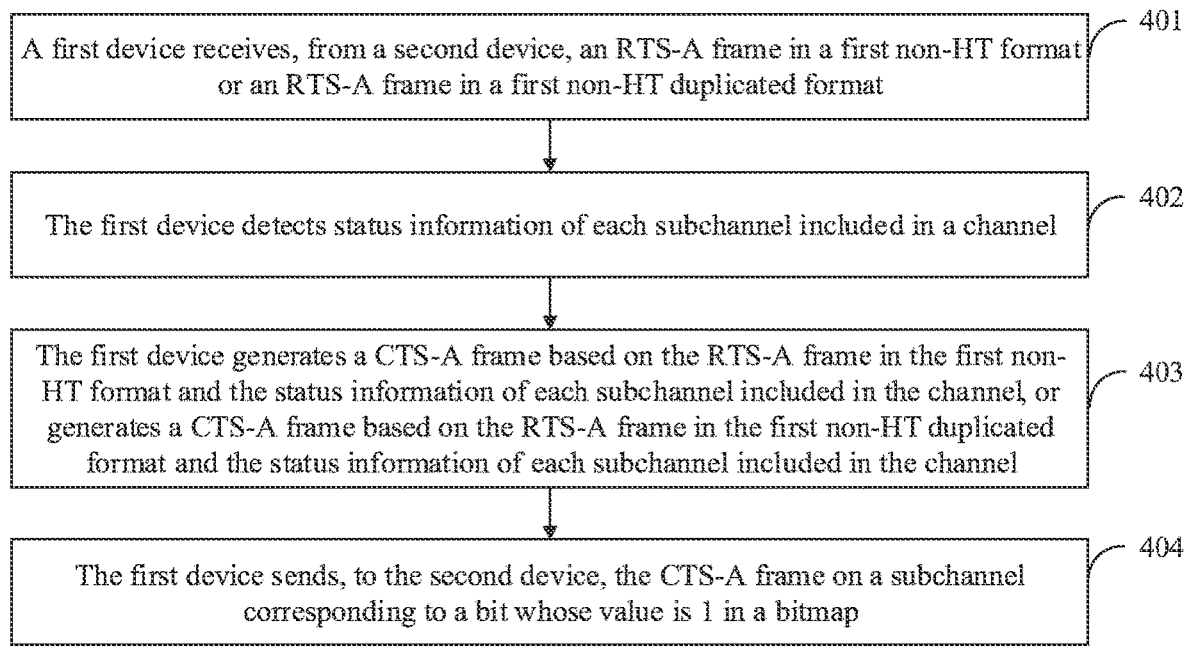
FIG. 4 is a flowchart of a channel indication method according to an embodiment of this application.

Referring to FIG. 4, an embodiment of this application provides a channel indication method. The method may be applied to the communications system shown in FIG. 1-1 or FIG. 1-2, and the method includes the following steps.

Step 401: A first device receives, from a second device, a request to send advanced (RTS-A) frame in a first non-HT format or an RTS-A frame in a first non-HT duplicated format.

Each of at least three bits in the first seven bits of a scrambling sequence of the RTS-A frame in the first non-HT format corresponds to at least one secondary subchannel of a channel, or each of at least three bits in the first seven bits of a scrambling sequence of the RTS-A frame in the first non-HT duplicated format corresponds to at least one secondary subchannel of a channel, the channel is a channel between the first device and the second device, a value 0 of a bit corresponding to a secondary subchannel indicates that the corresponding subchannel is unavailable, and a value 1 of the bit corresponding to the secondary subchannel indicates that the corresponding subchannel is available.

Optionally, the RTS-A frame is an RTS frame that uses at least three bits in the first seven bits of a scrambling sequence to carry bandwidth information. For example, each of the first seven bits of the scrambling sequence is used to correspond to one secondary 20 MHz subchannel other than a primary 20 MHz subchannel in a 160 (80+80) MHz channel. If a bit is set to 0, it indicates that a corresponding secondary 20 MHz subchannel is unavailable; and if the bit is set to 1, it indicates that the corresponding secondary 20 MHz subchannel is available. Because not all of the first seven bits of the scrambling sequence can be set to 0, it is not allowed to set all of the seven bits to 0 herein, that is, this solution cannot be used when the RTS-A frame is sent by using only the primary 20 MHz subchannel. It needs to be particularly emphasized that, when the RTS-A frame is sent in a bandwidth that does not exceed 80 MHz, seven bits are still used for indication. In this case, four bits corresponding to a secondary 80 MHz channel are set to 0.

Optionally, the RTS-A frame is a frame of a new type new frame type or a new trigger frame, a bitmap is carried in the RTS-A frame, and each bit in the bitmap corresponds to one 20 MHz subchannel. Because a new type of frame is introduced in this implementation, a size of the bitmap may be randomly extended. Therefore, the size of the bitmap may be extended to indicate a bandwidth wider than 160 MHz. For example, when a maximum communication bandwidth is 320 MHz, a 16-bit bitmap may be used, where each bit corresponds to one 20 MHz subchannel. Because the primary 20 MHz subchannel needs to be used, optionally, a bit corresponding to the primary 20 MHz subchannel may be set as a reserved bit.

Optionally, the RTS-A frame is a CTS-to-self frame. The CTS-to-self frame is duplicated, in a non-HT duplicated format, on all available 20 MHz subchannels including the primary 20 MHz subchannel. It should be noted that, for this implementation, the first device does not make a response in any form after receiving the CTS-to-self frame. In other words, a clear to send advanced (CTS-A) frame to be described below does not exist in this implementation.

Step 402: The first device detects status information of each subchannel included in the channel.

Optionally, the first device may detect status information of each subchannel between the first device and the second device. The status information of the subchannel may be idle or busy.

Step 403: The first device generates a CTS-A frame based on the RTS-A frame in the first non-HT format and the status information of each subchannel included in the channel, or generates a CTS-A frame based on the RTS-A frame in the first non-HT duplicated format and the status information of each subchannel included in the channel, where the CTS-A frame carries a bitmap, and each bit in the bitmap is used to indicate whether a corresponding subchannel is available.

Optionally, the CTS-A frame is a clear to send (CTS) frame. The CTS frame is sent in a non-HT format or a non-HT duplicated format. When the non-HT duplicated format is used for sending, duplication is performed only on an available 20 MHz subchannel.

Optionally, the CTS-A frame is a frame that carries an A-Control field of a bandwidth query report (BQR). The BQR includes an 8-bit bitmap, and each bit corresponds to one 20 MHz subchannel. A manner of using the BQR in this implementation is different from a manner of using a BQR in the 11ax standard in two aspects: (1) In the 11ax standard, the BQR is a response frame of BQRP, while in this implementation, the BQR is a response frame of the RTS-A frame. In other words, the BQR responds to the two types of frames. (2) In the 11ax standard, when the BQR is sent, the BQR may be replied with as long as one or more 20 MHz channels that carry the BQR and that correspond to a bitmap of the BQR are idle, and when it is determined, based on a channel detection result, that a state of a primary 20 MHz channel is busy, a bit corresponding to the primary 20 MHz channel is set to 0. However, in this implementation, the BQR may be replied with only when it is ensured that the primary 20 MHz channel is idle.

Optionally, the CTS-A frame is a frame that carries a new type of A-Control field. The new type of A-Control field includes a bitmap, and each bit corresponds to one 20 MHz subchannel. Because the new type of A-Control field is introduced in this implementation, a size of the bitmap may be randomly extended. Therefore, the size of the bitmap may be extended to indicate a bandwidth higher than 160 MHz. For example, when a maximum communication bandwidth is 320 MHz, a 16-bit bitmap may be used, where each bit corresponds to one 20 MHz channel. Because the primary 20 MHz channel needs to be used, optionally, a bit corresponding to the primary 20 MHz channel may be set as a reserved bit or a 15-bit bitmap is used.

Optionally, the CTS-A frame is a new type of frame. The new type of frame includes a bitmap, and each bit corresponds to one 20 MHz subchannel. Because the new type of frame is introduced in this implementation, a size of the bitmap may be randomly extended. Therefore, the size of the bitmap may be extended to indicate a bandwidth higher than 160 MHz. For example, when a maximum communication bandwidth is 320 MHz, a 16-bit bitmap may be used, where each bit corresponds to one 20 MHz subchannel. Because the primary 20 MHz subchannel needs to be used, optionally, a bit corresponding to the primary 20 MHz subchannel may be set as a reserved bit or a 15-bit bitmap is used.

Step 404: The first device sends, to the second device, the CTS-A frame on a subchannel corresponding to a bit whose value is 1 in the bitmap.

In this embodiment of this application, the first device generates the CTS-A frame, where the bitmap of the CTS-A frame is used to indicate a subchannel, in the channel, that is used for data communication and a subchannel, in the channel, that is not used for the data communication; and sends the CTS-A frame to the second device, so that the two parties negotiate the subchannel used for the data communication, and bandwidth negotiation is implemented.

Figure 5:
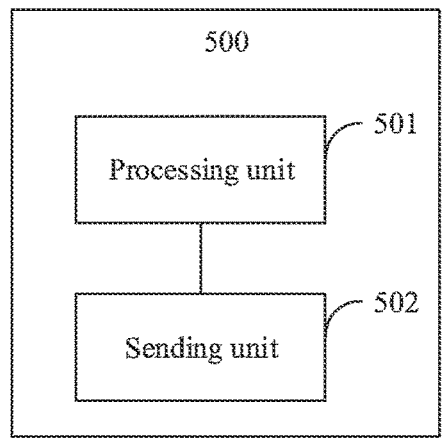
FIG. 5 is a schematic structural diagram of a bandwidth mode indication apparatus according to an embodiment of this application.

Referring to FIG. 5, an embodiment of this application provides a bandwidth mode indication apparatus 500. The apparatus 500 may be the second device or a part of the second device in the embodiment shown in FIG. 1-1 or FIG. 2-1, and includes a processing unit 501 and a sending unit 502.

The processing unit 501 is configured to: when a first device is an extremely high throughput EHT site, generate a frame in a first non-HT format or a frame in a first non-HT duplicated format, where at least three bits in the first seven bits of a scrambling sequence of the frame in the first non-HT format indicate a bandwidth mode of a channel, or at least three bits in the first seven bits of a scrambling sequence of the frame in the first non-HT duplicated format indicate a bandwidth mode of a channel, and the channel is a channel between the first device and the apparatus 500. The processing unit 501 is further configured to: when a first device is a VHT site or an HE site that does not support an EHT, generate a frame in a second non-HT format or a frame in a second non-HT duplicated format, where two bits in the first seven bits of a scrambling sequence of the frame in the second non-HT format indicate a bandwidth mode of a channel, or two bits in the first seven bits of a scrambling sequence of the frame in the second non-HT duplicated format indicate a bandwidth mode of a channel, and the channel is a channel between the first device and the apparatus 500.

The sending unit 502 is configured to send, to the first device, the frame in the first non-HT format or the frame in the first non-HT duplicated format.

The sending unit 502 is further configured to send, to the first device, the frame in the second non-HT format or the frame in the second non-HT duplicated format.

Optionally, when three bits in the first seven bits of the scrambling sequence of the frame in the first non-HT format indicate the bandwidth mode of the channel, or three bits in the first seven bits of the scrambling sequence of the frame in the first non-HT duplicated format indicate the bandwidth mode of the channel, the three bits are the second bit, the third bit, and the fourth bit in the first seven bits of the scrambling sequence, or the three bits are the fourth bit, the sixth bit, and the seventh bit in the first seven bits of the scrambling sequence.

Optionally, the channel includes one primary 20 MHz subchannel and M secondary 20 MHz subchannels, M is greater than or equal to 3, each of the at least three bits corresponds to at least one secondary subchannel, and a value of a bit corresponding to a secondary subchannel is used to indicate whether the secondary subchannel is available.

Optionally, when the value of the bit corresponding to the secondary subchannel is 1, the bit is used to indicate that the secondary subchannel is available, and when the value of the bit corresponding to the secondary subchannel is 0, the bit is used to indicate that the secondary subchannel is unavailable; or when the value of the bit corresponding to the secondary subchannel is 0, the bit is used to indicate that the secondary subchannel is available, and when the value of the bit corresponding to the secondary subchannel is 1, the bit is used to indicate that the secondary subchannel is unavailable.

In this embodiment of this application, when a device type of the first device is an EHT site, the at least three bits in the first seven bits of the scrambling sequence of the frame that is in the first non-HT format and that is generated by the processing unit indicate the bandwidth mode of the channel, or the at least three bits in the first seven bits of the scrambling sequence of the frame that is in the first non-HT duplicated format and that is generated by the processing unit indicate the bandwidth mode of the channel. Because the at least three bits can indicate more than four types of bandwidth modes, bandwidth modes that can be indicated to the first device by using the at least three bits include not only four types of bandwidth modes: a 20 M bandwidth mode, a 40 M bandwidth mode, an 80 M bandwidth mode, and a 160 (80+80) M bandwidth mode, but also new bandwidth modes such as a 240 M bandwidth mode and/or a 320 M bandwidth mode.

Figure 6:
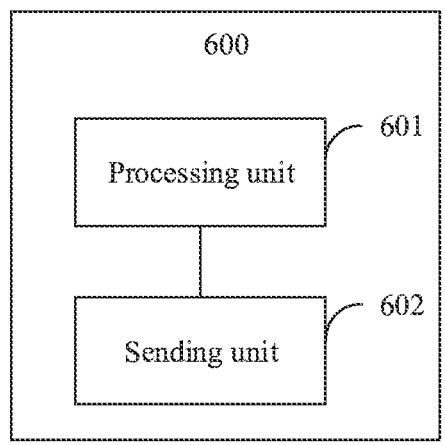
FIG. 6 is a schematic structural diagram of another bandwidth mode indication apparatus according to an embodiment of this application.

Referring to FIG. 6, an embodiment of this application provides a bandwidth mode indication apparatus 600. The apparatus 600 may be the second device or a part of the second device in the embodiment shown in FIG. 1-1 or FIG.

3-1, and includes: a processing unit 601, configured to generate a frame in a first non-HT format or a frame in a first non-HT duplicated format, where the frame in the first non-HT format includes first indication information, and the first indication information is used to indicate whether to use at least three bits in the first seven bits of a scrambling sequence of the frame in the first non-HT format to indicate a bandwidth mode of a channel; or the frame in the first non-HT duplicated format includes first indication information, and the first indication information is used to indicate whether to use at least three bits in the first seven bits of a scrambling sequence of the frame in the first non-HT duplicated format to indicate a bandwidth mode of a channel; and the channel is a channel between a first device and the apparatus 600; and a sending unit 602, configured to send, to the first device, the frame in the first non-HT format or the frame in the first non-HT duplicated format.

Optionally, the at least three bits in the first seven bits of the scrambling sequence of the frame in the first non-HT format indicate the bandwidth mode of the channel; or the at least three bits in the first seven bits of the scrambling sequence of the frame in the first non-HT duplicated format indicate the bandwidth mode of the channel.

Optionally, the first indication information is a globally unique/locally executed bit in a transmitter address field of the frame in the first non-HT format, or a unicast/broadcast bit in a receiver address field of the frame in the first non-HT format, or a to distributed system ToDS field, a from distributed system FromDS field, or a retry Retry field in a frame control Frame Control field of the frame in the first non-HT format.

Optionally, the first indication information is a globally unique/locally executed bit in a transmitter address field of the frame in the first non-HT duplicated format, or a unicast/broadcast bit in a receiver address field of the frame in the first non-HT duplicated format, or a ToDS field, a FromDS field, or a Retry field in a Frame Control field of the frame in the first non-HT duplicated format.

Optionally, when three bits in the first seven bits of the scrambling sequence of the frame in the first non-HT format indicate the bandwidth mode of the channel, or three bits in the first seven bits of the scrambling sequence of the frame in the first non-HT duplicated format indicate the bandwidth mode of the channel, the three bits are the second bit, the third bit, and the fourth bit in the first seven bits of the scrambling sequence, or the three bits are the fourth bit, the sixth bit, and the seventh bit in the first seven bits of the scrambling sequence.

Optionally, the channel includes one primary 20 MHz subchannel and M secondary 20 MHz subchannels, M is greater than or equal to 3, each of the at least three bits corresponds to at least one secondary subchannel, and a value of a bit corresponding to a secondary subchannel is used to indicate whether the secondary subchannel is available.

Optionally, when the value of the bit corresponding to the secondary subchannel is 1, the bit is used to indicate that the secondary subchannel is available, and when the value of the bit corresponding to the secondary subchannel is 0, the bit is used to indicate that the secondary subchannel is unavailable; or when the value of the bit corresponding to the secondary subchannel is 0, the bit is used to indicate that the secondary subchannel is available, and when the value of the bit corresponding to the secondary subchannel is 1, the bit is used to indicate that the secondary subchannel is unavailable.

In this embodiment of this application, the at least three bits in the first seven bits of the scrambling sequence of the frame that is in the first non-HT format and that is generated by the processing unit indicate the bandwidth mode of the channel, and the frame in the first non-HT format carries the first indication information; or the at least three bits in the first seven bits of the scrambling sequence of the frame that is in the first non-HT duplicated format and that is generated by the processing unit indicate the bandwidth mode of the channel, and the frame in the first non-HT duplicated format carries the first indication information. In this way, the first device may determine, based on the first indication information, that the at least three bits in the first seven bits of the scrambling sequence indicate the bandwidth mode. Because the at least three bits can indicate more than four types of bandwidth modes, bandwidth modes that can be indicated to the first device by using the at least three bits include not only four types of bandwidth modes: a 20 M bandwidth mode, a 40 M bandwidth mode, an 80 M bandwidth mode, and a 160 (80+80) M bandwidth mode, but also new bandwidth modes such as a 240 M bandwidth mode and/or a 320 M bandwidth mode.

Figure 7:
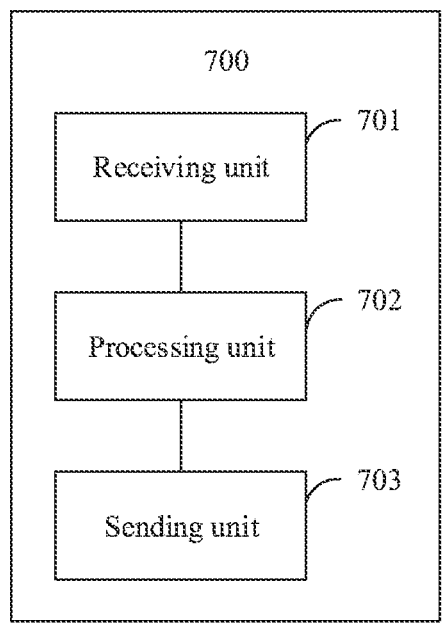
FIG. 7 is a schematic structural diagram of a channel indication apparatus according to an embodiment of this application.

Referring to FIG. 7, an embodiment of this application provides a channel indication apparatus 700. The apparatus 700 may be the first device or a part of the first device in the embodiment shown in FIG. 1-1 or FIG. 4, and includes: a receiving unit 701, configured to receive, from a second device, an RTS-A frame in a first non-HT format or an RTS-A frame in a first non-HT duplicated format, where each of at least three bits in the first seven bits of a scrambling sequence of the RTS-A frame in the first non-HT format corresponds to at least one secondary subchannel of a channel, or each of at least three bits in the first seven bits of a scrambling sequence of the RTS-A frame in the first non-HT duplicated format corresponds to at least one secondary subchannel of a channel, the channel is a channel between the apparatus 700 and the second device, and a value of a bit corresponding to a secondary subchannel is used to indicate whether the secondary subchannel is available; a processing unit 702, configured to: detect status information of each subchannel included in the channel; and generate a CTS-A frame based on the RTS-A frame in the first non-HT format and the status information of each subchannel included in the channel, or generate a CTS-A frame based on the RTS-A frame in the first non-HT duplicated format and the status information of each subchannel included in the channel, where the CTS-A frame includes a bitmap, and when the RTS-A frame in the first non-HT format or the RTS-A frame in the first non-HT duplicated format indicates that a subchannel is available and a channel state of the subchannel is idle, a bit corresponding to the subchannel in the bitmap is set to 1; otherwise, the bit corresponding to the subchannel in the bitmap is set to 0; and a sending unit 703, configured to send, to the second device, the CTS-A frame on a subchannel corresponding to a bit whose value is 1 in the bitmap.

Optionally, the RTS-A frame is an RTS frame that uses at least three bits in the first seven bits of a scrambling sequence to carry bandwidth information.

Optionally, the RTS-A frame is a frame of a new type or a new trigger frame, a bitmap is carried in the RTS-A frame, and each bit in the bitmap corresponds to one 20 MHz channel.

Optionally, the CTS-A frame is a CTS frame.

Optionally, the CTS-A frame is a frame that carries an A-Control field of a BQR.

Optionally, the CTS-A frame is a frame that carries a new type of A-Control field.

In this embodiment of this application, the first device generates the CTS-A frame, where the bitmap of the CTS-A frame is used to indicate a subchannel, in the channel, that is used for data communication and a subchannel, in the channel, that is not used for the data communication; and sends the CTS-A frame to the second device, so that the two parties negotiate the subchannel used for the data communication, and bandwidth negotiation is implemented.

Figure 8:
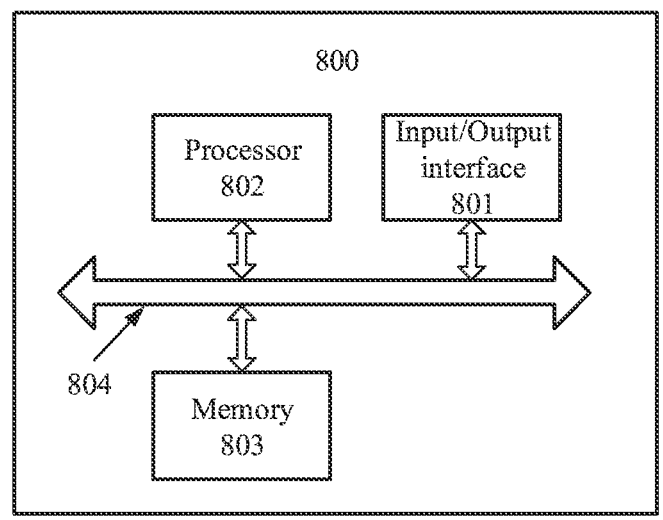
FIG. 8 is a schematic structural diagram of another bandwidth mode indication apparatus according to an embodiment of this application.

FIG. 8 is a schematic diagram of another bandwidth mode indication apparatus 800 according to an embodiment of this application. The apparatus 800 may be an application-specific integrated circuit, one or more FPGAs (field programmable gate array), a PLD (programmable logic device), a controller, a state machine, gate logic, a discrete hardware component, any other suitable circuit, any combination of circuits that can perform various functions described in this application, a chip, a board, a communications device, or the like. The apparatus 800 is disposed in the second device in the embodiment of FIG. 2-1 or the apparatus in the embodiment of FIG. 5, and may be configured to perform an operation performed by the second device in the method of FIG. 2-1. As shown in FIG. 8, the apparatus 800 includes an input/output interface 8*oi*, a processor 802, and a memory 803. The input/output interface 8*oi*, the processor 802, and the memory 803 may be connected through a bus system 804.

The memory 803 is configured to store a program, an instruction, or code. The processor 802 is configured to execute the program, the instruction, or the code in the memory 803, to control the input/output interface 8*oi* to receive or send a signal and implement the steps and the functions implemented by the second device in the implementation corresponding to FIG. 2-1. Details are not described herein again. For specific implementations of the input/output interface 8*oi* and the processor 802, correspondingly refer to specific descriptions of the sending unit 502 and the processing unit 501 in FIG. 5. Details are not described herein again.

Figure 9:
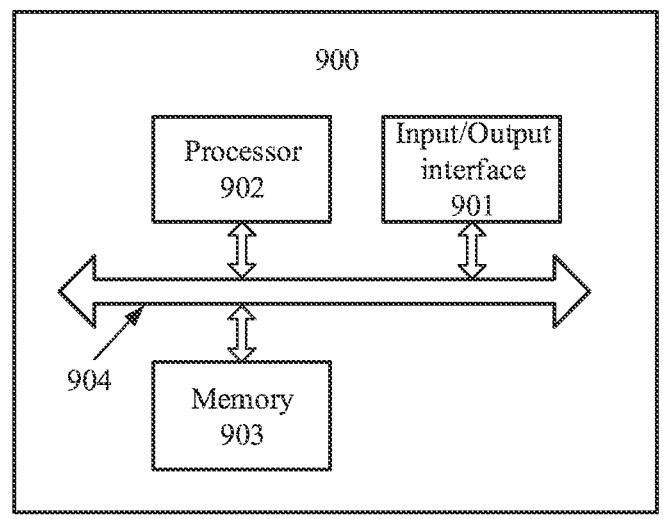
FIG. 9 is a schematic structural diagram of another bandwidth mode indication apparatus according to an embodiment of this application.

FIG. 9 is a schematic diagram of another bandwidth mode indication apparatus 900 according to an embodiment of this application. The apparatus 900 may be an application-specific integrated circuit, one or more FPGAs (field programmable gate array), a PLD (programmable logic device), a controller, a state machine, gate logic, a discrete hardware component, any other suitable circuit, any combination of circuits that can perform various functions described in this application, a chip, a board, a communications device, or the like. The apparatus 900 is disposed in the second device in the embodiment of FIG. 3-1 or the apparatus in the embodiment of FIG. 6, and may be configured to perform an operation performed by the second device in the method of FIG. 3-1. As shown in FIG. 9, the apparatus 900 includes an input/output interface 901, a processor 902, and a memory 903. The input/output interface 901, the processor 902, and the memory 903 may be connected through a bus system 904.

The memory 903 is configured to store a program, an instruction, or code. The processor 902 is configured to execute the program, the instruction, or the code in the memory 903, to control the input/output interface 901 to receive or send a signal and implement the steps and the functions implemented by the second device in the implementation corresponding to FIG. 3-1. Details are not described herein again. For specific implementations of the input/output interface 901 and the processor 902, correspondingly refer to specific descriptions of the sending unit 602 and the processing unit 601 in FIG. 6. Details are not described herein again.

Figure 10:
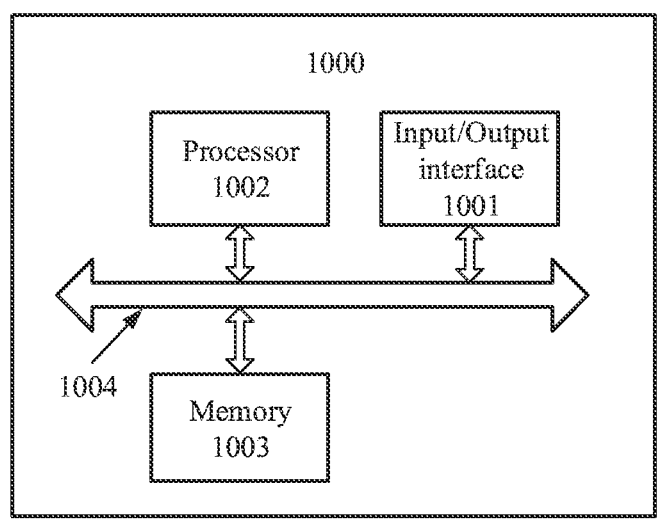
FIG. 10 is a schematic structural diagram of another channel indication apparatus according to an embodiment of this application.

FIG. 10 is a schematic diagram of another bandwidth mode indication apparatus 1000 according to an embodiment of this application. The apparatus 1000 may be an application-specific integrated circuit, one or more FPGAs (field programmable gate array), a PLD (programmable logic device), a controller, a state machine, gate logic, a discrete hardware component, any other suitable circuit, any combination of circuits that can perform various functions described in this application, a chip, a board, a communications device, or the like. The apparatus 1000 is configured in the first device in the embodiment of FIG. 4 or the apparatus in the embodiment of FIG. 7, and may be configured to perform an operation performed by the first device in the method of FIG. 4. As shown in FIG. 10, the apparatus 1000 includes an input/output interface 1001, a processor 1002, and a memory 1003. The input/output interface 1001, the processor 1002, and the memory 1003 may be connected through a bus system 1004.

The memory 1003 is configured to store a program, an instruction, or code. The processor 1002 is configured to execute the program, the instruction, or the code in the memory 1003, to control the input/output interface 1001 to receive or send a signal and implement the steps and the functions implemented by the first device in the implementation corresponding to FIG. 4. Details are not described herein again. For specific implementations of the input/output interface 1001, correspondingly refer to specific descriptions of the receiving unit 701 and the sending unit 703 in FIG. 7, and for specific implementations of the processor 1002, correspondingly refer to specific descriptions of the processing unit 702 in FIG. 7. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application shall fall within the protection scope of this application.

What is claimed is:

1. A method, comprising:
    generating, by a second device, a frame, wherein:
        when a first device is an extremely high throughput (EHT) site, the second device generates the frame to be in a first non-high throughput (non-HT) format or in a first non-high throughput duplicated (non-HT duplicated) format, wherein at least three bits in a first seven bits of a scrambling sequence of the frame in the first non-HT format indicate a bandwidth mode of a channel, or at least three bits in a first seven bits of a scrambling sequence of the frame in the first non-HT duplicated format indicate a bandwidth mode of a channel, and the channel is between the first device and the second device; or
        when the first device is a very high throughput (VHT) site or a high efficiency (HE) site that does not support EHT, the second device generates the frame to be in a second non-HT format or in a second non-HT duplicated format, wherein two bits in a first seven bits of a scrambling sequence of the frame in the second non-HT format indicate a bandwidth mode of the channel, or two bits in a first seven bits of a scrambling sequence of the frame in the second non-HT duplicated format indicate the bandwidth mode of the channel; and sending, by the second device to the first device, the frame, wherein sending the frame comprises:
 sending, to the first device, the frame in the first non-HT format or the frame in the first non-HT duplicated format; or
 sending, to the first device, the frame in the second non-HT format or the frame in the second non-HT duplicated format; and wherein when the first device is the EHT site, and the frame is in the first non-HT format or in the first non-HT duplicated format, the channel comprises one primary 20 MHz subchannel and M secondary 20 MHz subchannels, M is greater than or equal to 3, each bit of the at least three bits corresponds to at least one secondary 20 MHz subchannel, and, for each bit of the at least three bits, a value of the respective bit indicates whether the corresponding 20 MHz secondary subchannel is available, and for each bit of the at least three bits, when the value of the respective bit is zero (0), the respective bit indicates that the corresponding secondary subchannel is available, and when the value of the respective bit is 1, the respective bit indicates that the corresponding secondary subchannel is unavailable.

2. The method according to claim 1, wherein when the first device is the EHT site, and the frame is in the first non-HT format or in the first non-HT duplicated format, and when three bits of the at least three bits in the first seven bits of the scrambling sequence of the frame in the first non-HT format indicate the bandwidth mode of the channel, or three bits of the at least three bits in the first seven bits of the scrambling sequence of the frame in the first non-HT duplicated format indicate the bandwidth mode of the channel, the three bits are the second bit, the third bit, and the fourth bit in the first seven bits of the scrambling sequence.

3. The method according to claim 1, wherein when the first device is the EHT site, and the frame is in the first non-HT format or in the first non-HT duplicated format, and when three bits of the at least three bits in the first seven bits of the scrambling sequence of the frame in the first non-HT format indicate the bandwidth mode of the channel, or three bits of the at least three bits in the first seven bits of the scrambling sequence of the frame in the first non-HT duplicated format indicate the bandwidth mode of the channel, the three bits are the fourth bit, the sixth bit, and the seventh bit in the first seven bits of the scrambling sequence.

4. The method according to claim 1, wherein when the first device is the EHT site, and the frame is in the first non-HT format, the frame in the first non-HT format comprises first indication information, and the first indication information indicates whether the at least three bits in the first seven bits of a scrambling sequence of the frame in the first non-HT format indicate the bandwidth mode.

5. The method according to claim 4, wherein the first indication information is:
 a to distributed system (ToDS) field, a from distributed system (FromDS) field, or a retry field in a frame control field of the frame in the first non-HT format.

6. The method according to claim 4, wherein the first indication information is:
 a globally unique/locally executed bit in a transmitter address field of the frame in the first non-HT format.

7. The method according to claim 4, wherein the first indication information is:
 a unicast/broadcast bit in a receiver address field of the frame in the first non-HT format.

8. A method, comprising:
generating, by a second device, a frame in a first non-high throughput (non-HT) format or a frame in a first non-high throughput duplicated (non-HT duplicated) format, wherein:
 the frame in the first non-HT format comprises first indication information, and the first indication information indicates whether to use at least three bits in a first seven bits of a scrambling sequence of the frame in the first non-HT format to indicate a bandwidth mode; or
 the frame in the first non-HT duplicated format comprises first indication information, and the first indication information indicates whether to use at least three bits in a first seven bits of a scrambling sequence of the frame in the first non-HT duplicated format to indicate a bandwidth mode; and sending, by the second device to the first device, the frame in the first non-HT format or the frame in the first non-HT duplicated format; and wherein when the channel comprises one primary 20 MHz subchannel and M secondary 20 MHz subchannels, and M is greater than or equal to 3, each bit of the at least three bits corresponds to at least one secondary subchannel, and, for each bit of the at least three bits, a value of the respective bit indicates whether the corresponding secondary subchannel is available, and wherein, for each bit of the at least three bits, when the value of the respective bit is zero (0), the respective bit indicates that the corresponding secondary subchannel is available, and when the value of the respective bit is 1, the respective bit indicates that the secondary subchannel is unavailable.

9. The method according to claim 8, wherein the first indication information is:
 a globally unique/locally executed bit in a transmitter address field of the frame in the first non-HT format.

10. The method according to claim 8, wherein the first indication information is:
 a unicast/broadcast bit in a receiver address field of the frame in the first non-HT format.

11. The method according to claim 8, wherein the first indication information is:
 a to distributed system (ToDS) field, a from distributed system (FromDS) field, or a retry field in a frame control field of the frame in the first non-HT format.

12. The method according to claim 8, wherein the first indication information is:
 a globally unique/locally executed bit in a transmitter address field of the frame in the first non-HT duplicated format;
 a unicast/broadcast bit in a receiver address field of the frame in the first non-HT duplicated format; or
 a ToDS field, a FromDS field, or a Retry field in a Frame Control field of the frame in the first non-HT duplicated format.

13. The method according to claim 8, wherein when three bits of the at least three bits in the first seven bits of the scrambling sequence of the frame in the first non-HT format indicate the bandwidth mode of a channel, or three bits of the at least three bits in the first seven bits of the scrambling sequence of the frame in the first non-HT duplicated format indicate the bandwidth mode of the channel, the three bits are the second bit, the third bit, and the fourth bit in the first seven bits of the scrambling sequence, or the three bits are the fourth bit, the sixth bit, and the seventh bit in the first seven bits of the scrambling sequence.

14. An apparatus, comprising:
a processor; and
a transceiver coupled to the processor;
wherein the processor is configured to:
generate a frame, wherein:
when a first device is an extremely high throughput (EHT) site, the frame is generated in a first non-high throughput (non-HT) format or in a first non-high throughput duplicated (non-HT duplicated) format, wherein at least three bits in a first seven bits of a scrambling sequence of the frame in the first non-HT format indicate a bandwidth mode of a channel, or at least three bits in a first seven bits of a scrambling sequence of the frame in the first non-HT duplicated format indicate a bandwidth mode of a channel, and the channel is between the first device and the apparatus; or
when a first device is a very high throughput (VHT) site or a high efficiency (HE) site that does not support an EHT, the frame is generated in a second non-HT format or a in a second non-HT duplicated format, wherein two bits in a first seven bits of a scrambling sequence of the frame in the second non-HT format indicate the bandwidth mode of the channel, or two bits in a first seven bits of a scrambling sequence of the frame in the second non-HT duplicated format indicate the bandwidth mode of the channel; and
wherein the transceiver is configured to:
send, to the first device, the frame in the first non-HT format or the frame in the first non-HT duplicated format; or
send, to the first device, the frame in the second non-HT format or the frame in the second non-HT duplicated format; and
wherein when the channel comprises one primary 20 MHz subchannel and M secondary 20 MHz subchannels, M is greater than or equal to 3, and wherein when the first device is the EHT site, and the frame is in the first non-HT format or in the first non-HT duplicated format, each bit of the at least three bits corresponds to at least one secondary 20 MHz subchannel, and, for each bit of the at least three bits, a value of the respective bit indicates whether the corresponding secondary subchannel is available, and wherein for each bit of the at least three bits, when the value of the respective bit is zero (0), the respective bit indicates that the corresponding secondary subchannel is available, and when the value of the respective bit is 1, the respective bit indicates that the corresponding secondary subchannel is unavailable.

15. The apparatus according to claim 14, wherein when the first device is the EHT site, and the frame is in the first non-HT format or in the first non-HT duplicated format, and when three bits of the at least three bits in the first seven bits of the scrambling sequence of the frame in the first non-HT format indicate the bandwidth mode of the channel, or three bits in the first seven bits of the scrambling sequence of the frame in the first non-HT duplicated format indicate the bandwidth mode of the channel, the three bits are the second bit, the third bit, and the fourth bit in the first seven bits of the scrambling sequence.

16. The apparatus according to claim 14, wherein when the first device is the EHT site, and the frame is in the first non-HT format or in the first non-HT duplicated format, and when three bits of the at least three bits in the first seven bits of the scrambling sequence of the frame in the first non-HT format indicate the bandwidth mode of the channel, or three bits in the first seven bits of the scrambling sequence of the frame in the first non-HT duplicated format indicate the bandwidth mode of the channel the three bits are the fourth bit, the sixth bit, and the seventh bit in the first seven bits of the scrambling sequence.

17. The apparatus according to claim 14, wherein when the first device is the EHT site, and the frame is in the first non-HT format, the frame in the first non-HT format comprises first indication information, and the first indication information indicates whether the at least three bits in the first seven bits of a scrambling sequence of the frame in the first non-HT format indicate the bandwidth mode.

18. The apparatus according to claim 17, wherein the first indication information is:
a to distributed system (ToDS) field, a from distributed system (FromDS) field, or a retry field in a frame control field of the frame in the first non-HT format.

19. The apparatus according to claim 17, wherein the first indication information is:
a globally unique/locally executed bit in a transmitter address field of the frame in the first non-HT format.

20. The apparatus according to claim 17, wherein the first indication information is:
a unicast/broadcast bit in a receiver address field of the frame in the first non-HT format.

* * * * *